United States Patent [19]
Ekonen et al.

[11] Patent Number: 5,676,356
[45] Date of Patent: Oct. 14, 1997

[54] FLEXIBLE BOLSTER

[75] Inventors: Martin A. Ekonen, Gaylord, Mich.; Tjong T. Lie, Naperville, Ill.; Ronald J. McLaughlin, Maumee, Ohio; Charles A. Vanbreemen, Glen Ellyn, Ill.

[73] Assignee: The Boler Company, Itasca, Ill.

[21] Appl. No.: 657,633

[22] Filed: May 30, 1996

[51] Int. Cl.[6] .................. B60G 11/22; F16F 1/40
[52] U.S. Cl. .............. 267/294; 267/6; 267/141.1; 280/716; 411/383; 411/392; 248/634
[58] Field of Search ................... 267/6, 33, 140, 267/140.2, 40.3, 140.4, 141.1, 141.2, 153, 292–294, 148; 248/580, 619, 621, 634; 280/716; 52/167.7, 167.9; 411/392, 383

[56] References Cited

U.S. PATENT DOCUMENTS

| | | | |
|---|---|---|---|
| 1,671,764 | 5/1928 | Dickey | 267/292 |
| 1,850,289 | 3/1932 | Saurer . | |
| 1,924,237 | 8/1933 | Glascodine . | |
| 1,930,098 | 10/1933 | Hossfeld . | |
| 2,044,649 | 6/1936 | Swennes et al. | 267/140.4 |
| 2,982,536 | 5/1961 | Kordes . | |
| 3,625,501 | 12/1971 | Hein . | |
| 3,819,206 | 6/1974 | Aarons et al. . | |
| 4,348,015 | 9/1982 | Domer . | |
| 4,464,986 | 8/1984 | Bollani . | |
| 4,489,548 | 12/1984 | Derman . | |
| 4,527,365 | 7/1985 | Yoshizawa et al. . | |
| 4,556,203 | 12/1985 | Rourke et al. . | |
| 4,589,179 | 5/1986 | Hulting, Jr. | 411/392 |
| 4,615,513 | 10/1986 | Thaung et al. . | |
| 4,718,206 | 1/1988 | Fyfe et al. | 248/634 |
| 4,921,203 | 5/1990 | Peterson et al. . | |
| 4,995,598 | 2/1991 | Ingham . | |
| 5,014,474 | 5/1991 | Fyfe et al. . | |
| 5,228,664 | 7/1993 | Moulinet . | |
| 5,242,147 | 9/1993 | Kemeny . | |
| 5,451,074 | 9/1995 | Guitarini | 411/392 |
| 5,452,548 | 9/1995 | Kwan | 52/167.7 |

FOREIGN PATENT DOCUMENTS

| | | | |
|---|---|---|---|
| 2509000 | 1/1983 | France | 267/148 |
| 4001695 | 1/1994 | WIPO | 267/141.1 |

*Primary Examiner*—Robert J. Oberleitner
*Assistant Examiner*—Chris Schwartz
*Attorney, Agent, or Firm*—Lockwood, Alex, FitzGibbon & Cummings

[57] ABSTRACT

A flexible bolster for installation between two load-carrying members in a vehicle suspension. The bolster comprises a block of rubber or rubber-like elastomer sandwiched between two end plates. The block of rubber preferably has molded thereon a plurality of metal washers or plates oriented parallel to each other and the end plates. A bore extends axially through the end plates and block of rubber. A rebound control restraint is disposed in the bore. The restraint comprise a length of cable having retainers swaged to its opposite ends. Each retainer has an enlarged part or assembly which bears against the outer side of one of the end plates. The restraint acts to limit the extent to which the end plates separate when the bolster is under tension and thereby controls rebound. The restraint is free so as not to absorb compression or shear forces applied to the bolster.

1 Claim, 1 Drawing Sheet

5,676,356

FLEXIBLE BOLSTER

BACKGROUND AND DESCRIPTION OF THE INVENTION

This invention relates, generally, to innovations and improvements in flexible bolsters (sometimes also referred to as "compression mounts" or "rubber mounts") for transmitting compression and tension forces in substantially all directions between two load carrying members in a vehicle suspension.

More particularly, the invention relates to innovations and improvements in flexible bolsters of the kind shown and described in U.S. Pat. No. 4,615,513 dated Oct. 7, 1986. This patent discloses a flexible bolster which comprises a pair of end plates with a cylindrical block of rubber interposed therebetween in which are molded a plurality of parallel reinforcing washer shaped plates and a chain link interconnected at opposite ends between a pair of U-bolts. The flexible bolster of the present invention includes a number of advantages over the flexible bolster of U.S. Pat. No. 4,615,513, including: ease of manufacture and assembly; is lighter in weight and occupies less space for a given capacity; reduced molding times required; molded-in separator plates or washers have smaller center holes and maximum surface areas for rubber bonding; contains a restraining device that is easily installed and is less likely to abrade and destroy rubber or elastomer internally; contains a restraining device that is not stressed by normal mounting and which tolerates shear as well as axial deflection.

The object of the invention, generally stated, is the provision of a new and improved flexible bolster which is particularly suited for use in the suspensions used in heavy duty vehicles and which exhibits the foregoing and other advantages over the prior art.

For a complete understanding of the nature and scope of the invention, reference may now be had to the following detailed description of a presently preferred embodiment taken in conjunction with the accompanying drawings, wherein:

DETAILED DESCRIPTION OF THE PREFERRED EMBODIMENTS

Figure 1:
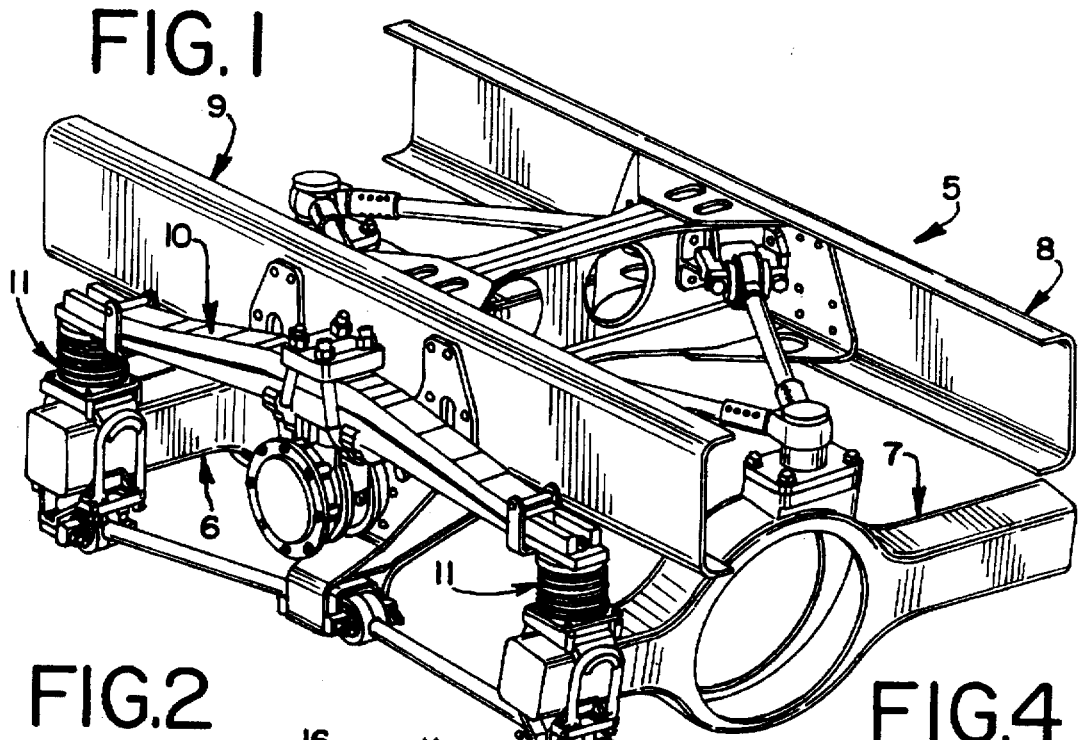
FIG. 1 is a perspective view of a dual axle suspension (incomplete as shown) in which flexible bolsters of the present invention are installed.
Figure 2:
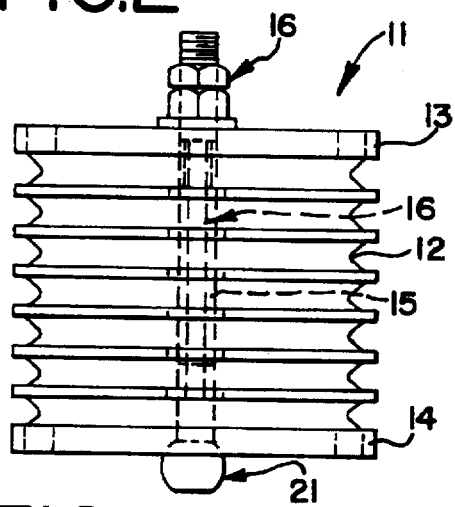
FIG. 2 is a side elevational view of a flexible bolster forming an embodiment of the invention such as may be installed in the suspension shown in FIG. 2.

Referring to FIG. 1, a suspension is indicated generally at 5 which has front and rear axles indicated generally at 6 and 7. The suspension 5 will have a pair of fore-and-aft extending side frame members indicated generally at 8 and 9 and a pair of fore-and-aft extending load leaf springs one of which is indicated generally at 10. The opposite ends of each leaf spring 10 extend in spaced relationship above the adjacent ends of the axles 6 and 7 and are supported thereon by flexible bolsters indicated generally at 11—11.

The details of construction of the flexible bolsters 11 will now be described in connection with FIGS. 2–5. Each bolster 11 comprises a cylindrical block of rubber or resilient rubber like elastomer 12 sandwiched between opposing end plates 13 and 14. A center bore 15 extends axially through the end plates 13 and 14 and through the intermediate rubber block 12. A rebound control restraint indicated generally at 16 extends axially through the bore 15.

The configuration stability of the rubber block 12 under compressive forces or load is enhanced by the provision of a series of molded-in flat washer-like separator plates 17—17. The center holes in the plates 17 are relatively small and only slightly larger in diameter than the center bore 15 so that there is maximum contact during curing between the surfaces of the separator plates 17 and the rubber material forming the block 15. This maximum contact enhances the shape or configuration stabilizing effect provided by the washers or plates 17.

The rebound control restraint 16 comprises a length of wire cable 20 disposed in the bore 15 and provided on one end with a retainer indicated generally at 21 and at the opposite end with a retainer assembly indicated generally at 22.

The retainer 21 comprises a generally spherical knob 23 from which extends an integrally formed stem 24 sized to fit freely in the bore 15. The distal end 25 of the stem 24 is formed with a socket and swaged onto an end of the length of cable 20 as shown. A portion of the generally spherical surface of the knob 23 is normally seated within a correspondingly shaped concave surface in the end plate 14 at one end of the center bore 15.

The retainer assembly 22 on the other end of the cable 20 comprises several parts, one being a cylindrical screw 26 the inner end of which is in the form of a sleeve 27 which is swaged onto the adjacent end of the length of cable 20. Preferably a flat washer 28 is placed over the screw 26 and against the outer face of the end plate 13. A hex nut 30 is tightened onto the washer 28 and secured against becoming loose by a jam nut 31. In the absence of the washer 28 the nut 30 will be screwed down into engagement with the outer side of the plate 13.

Figure 3:
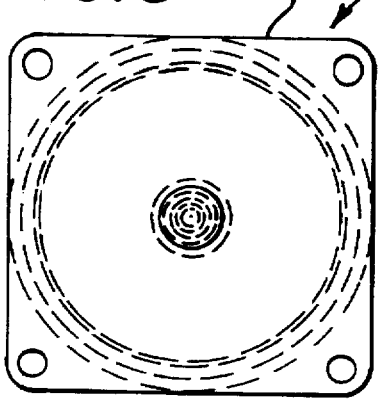
FIG. 3 is a bottom plan view of the bolster shown in FIG. 2.
Figure 4:
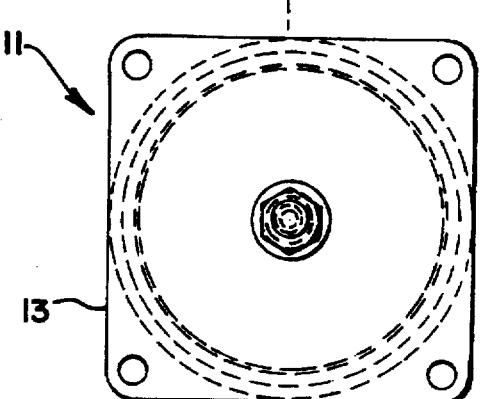
FIG. 4 is a top plan view of the bolster shown in FIG. 2.
Figure 5:
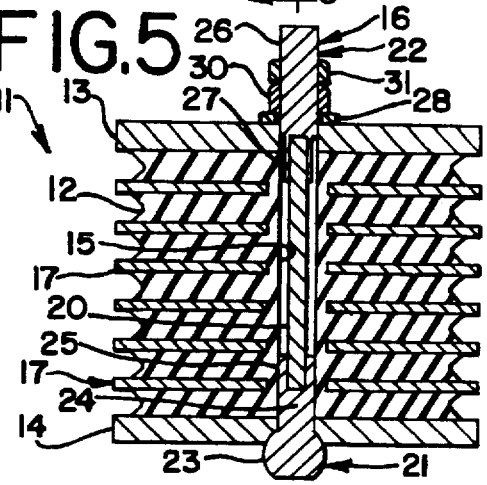
FIG. 5 is a vertical sectional view taken on line 5—5 of FIG. 4.

As will be seen in FIGS. 3 and 4, the end plates 13 and 14 are generally square and the corners are provided with apertures or bolt holes so that the end plates can be fastened to load carrying parts in a vehicle suspension as shown in suspension 5 in FIG. 1.

In order to manufacture the bolster 11, the end plates 13 and 14 and the separator plates 17 are placed in a suitable mold and the rubber or rubber like elastomer is injected into the mold and allowed to cure so as to become firmly bonded to the engaged surfaces of the end plates 13 and 14 and the separator plates 17. A core will be inserted in the mold so as to form the center bore 15.

After the curing operation is complete, the assembly is removed from the mold and the core removed from the molded unit so as to leave the center bore 15 open for receiving the rebound restraint or control 16. The production of the bolster 11 is completed by passing the screw 26 with the cable 20 attached through the bore 15 and applying the washer 28, hex nut 30 and jam nut 31 thereto.

When a bolster 11 is placed between two load carrying members or parts as in the suspension 5 in FIG. 1, it Will in use be subjected to both compression loads and tension loads, the latter, particularly on rebound. When subjected to compression loads, the end plates 13 and 14 will be urged towards each other and in many instances, the compression loads will be such as to cause the end plates 13 and 14 to become tilted with respect to each other. However, no compression forces will be applied to the rebound control restraint assembly 16 when the bolster 11 is under compression since each of the end plates 13 and 14 is free to move towards the other without binding or hanging up on either of the retainers 21 or 22. When a bolster 11 is subjected to a shear load so as to cause the end plates 13 and 14 to shift laterally with respect to each other, such relative movement will be accommodated by the cable restraint assembly 16 due to the flexibility of the cable 20 and the pivoting action of the knob 23 with respect to the end plate 14. When rebound or tension forces are applied to the end plates 13 and 14 so as to cause them to separate, then the retainers 21 and 22 will become engaged against the outer sides of the end plates and tension will be applied to the cable 20 so as to restrain the plates 13 and 14 from rebounding and moving apart.

It will be understood that changes of an obvious nature can be made in the embodiment of the invention as shown and described without departing from the spirit and scope of the invention as set forth in the claim. For example, either the retainer 21 and/or the retainer assembly 22 may be replaced with a collar or sleeve swaged onto the respective end of cable 20, each collar being large enough to seat against the outer surface of the adjacent end plate 13 or 14 and thereby secure the rebound control restraint 16 in place.

What is claimed is:

1. A flexible bolster for transmitting forces in substantially all directions when installed between load-carrying members in a vehicle suspension, comprising two opposing end plates each for connection to one of said load-carrying members and which are substantially parallel to each other when said bolster is in its unloaded condition, a cylindrical block of rubber or resilient elastomer sandwiched between said end plates and attached thereto by curing in contact therewith so as to resist being separated therefrom, a continuous bore extending axially through said end plates and said block, and a rebound control restraint extending through said bore and comprising a length of cable within said bore having secured to one end a first retainer means having a generally spherical convex surface seated in a mating concave surface formed in the outer side of one of said end plates at one end of said bore and having secured to the other end of said length of cable a second retainer means in engagement with the outer side of the other end plate at the opposite end of said bore, said rebound control restraint being under tension when controlling rebound but not subject to absorbing compression forces applied to said bolster and allowing said end plates to shift laterally with respect to each other and wherein said second retainer means comprises a cylindrical screw which projects from said other end plate and has an integrally formed socket on its distal end within the adjacent end of said bore into which an end of said length of cable is swaged, a nut screwed down on said cylindrical screw into engagement either with said outer side of the adjacent end plate or a washer disposed between said nut and said adjacent end plate.

\* \* \* \* \*